(12) United States Patent
Gebert et al.

(10) Patent No.: US 7,886,722 B2
(45) Date of Patent: *Feb. 15, 2011

(54) FUEL TANK FOR A MOTOR VEHICLE

(75) Inventors: Klaus Gebert, Willich (DE); Thomas Schafer, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,303

(22) Filed: Jul. 30, 2009

(65) Prior Publication Data

US 2009/0288644 A1      Nov. 26, 2009

Related U.S. Application Data

(63) Continuation of application No. 11/567,918, filed on Dec. 7, 2006, now Pat. No. 7,634,987.

(30) Foreign Application Priority Data

Dec. 7, 2005   (DE) ................. 10 2005 058 617

(51) Int. Cl.
*F02M 33/02* (2006.01)
(52) U.S. Cl. ........................... 123/518; 417/407
(58) Field of Classification Search ............... 123/516, 123/518, 519, 520, 522, 523, 524; 137/565.01, 137/565.17, 565.22; 220/4.14
See application file for complete search history.

(56) References Cited

U.S. PATENT DOCUMENTS 5,992,473 A * 11/1999 Hammonds .................. 141/9
7,185,638 B2 * 3/2007 Krogull et al. ............. 123/509

* cited by examiner

*Primary Examiner*—Stephen K Cronin
*Assistant Examiner*—Anthony L Bacon
(74) *Attorney, Agent, or Firm*—Grossman, Tucker, Perreault & Pfleger, PLLC

(57) ABSTRACT

The invention concerns a fuel tank for a motor vehicle, comprising at least one venting device which is connected to a fuel vapor filter, wherein the venting device includes at least one collecting container for receiving liquid fuel. The fuel tank is distinguished in that disposed within the collecting container is a delivery pump for emptying it into the delivery volume of the fuel tank.

5 Claims, 3 Drawing Sheets

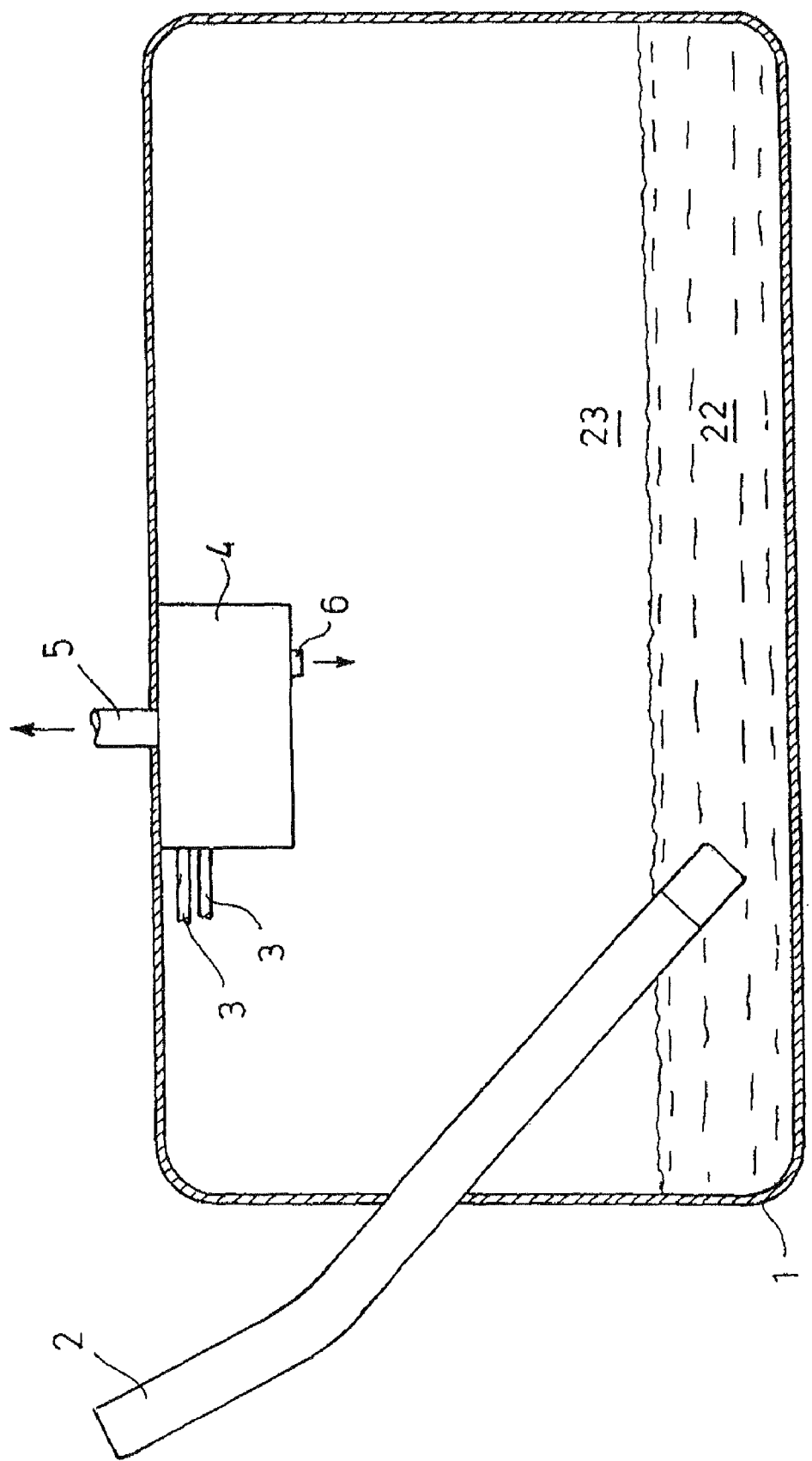

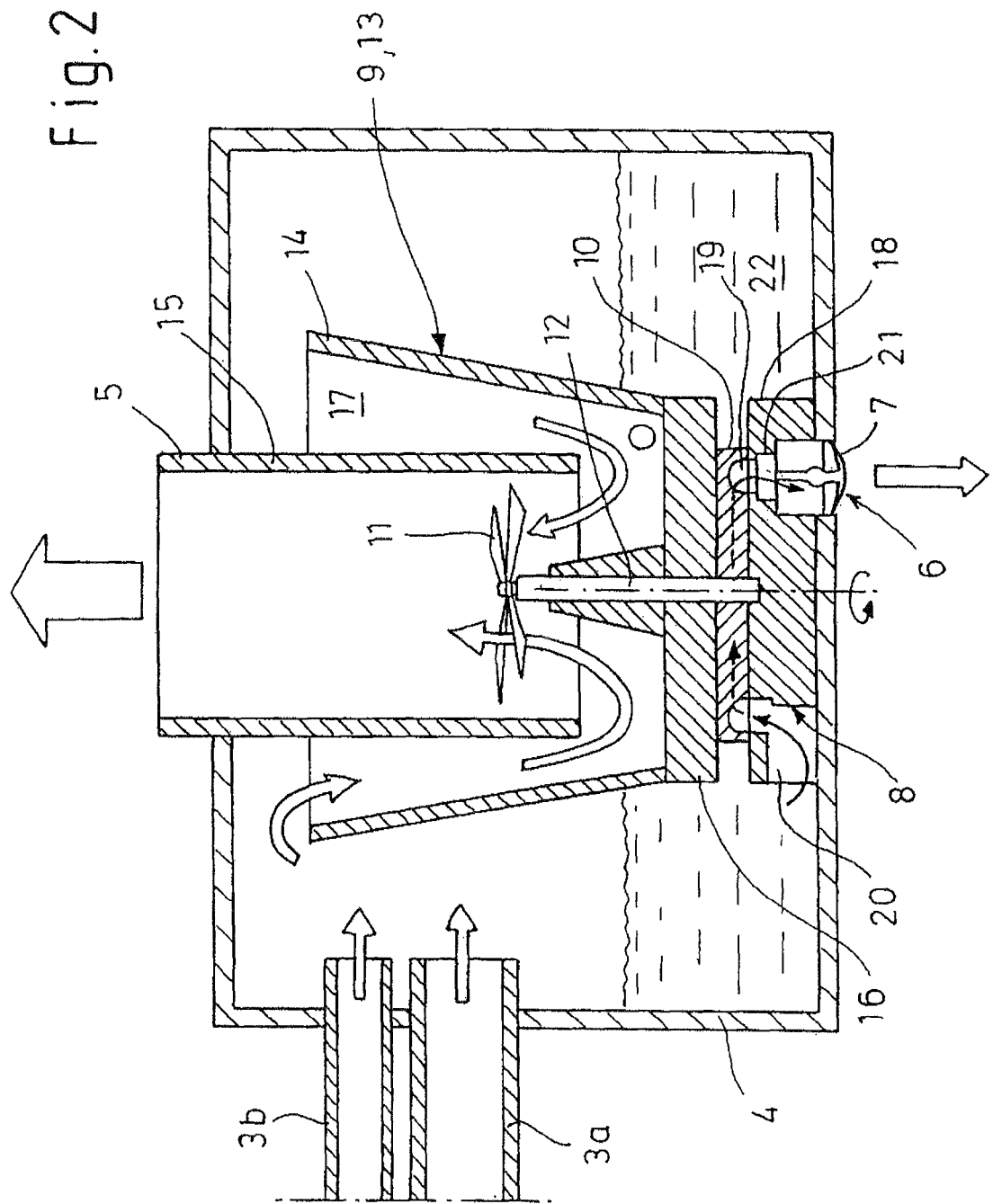

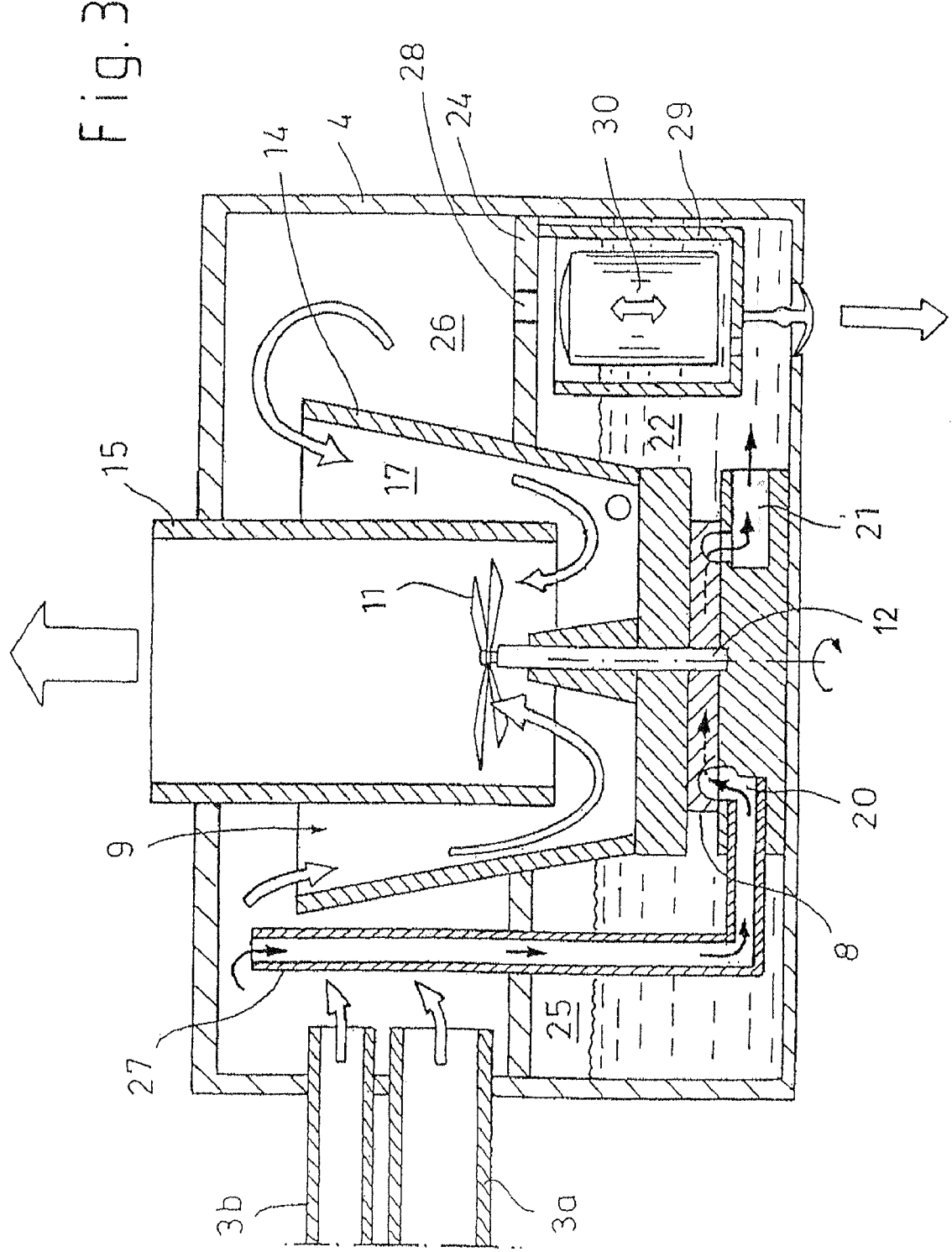

FUEL TANK FOR A MOTOR VEHICLE

CROSS-REFERENCE TO RELATED APPLICATIONS

This application is a continuation of U.S. application Ser. No. 11/567,918 filed Dec. 7, 2006, which claims priority to German Application DE 10 2005 058617.1, filed Dec. 7, 2005.

FIELD

The invention concerns a fuel tank for a motor vehicle, comprising at least one venting device which is connected to a fuel vapor filter, wherein the venting device includes at least one collecting container for receiving liquid fuel.

BACKGROUND

A fuel tank of that kind is known for example from EP 1 196 303 B1. The fuel tank known from EP 1 196 303 includes means for venting same when refuelling the tank and in operation of the motor vehicle. The venting lines are connected in known manner by way of a collecting container to a pressure compensating line connected to an activated carbon filter.

When filling the fuel tank with fuel the gas present in the tank is displaced by the incoming flow of liquid. So that no hydrocarbons are discharged to the atmosphere in the refuelling operation, the gas volume flow which is displaced in the refuelling operation is usually discharged to the atmosphere by way of a fuel vapor filter. The gases which are produced in operation of the motor vehicle as a result of evaporation of the fuel are also discharged to the atmosphere in a cleaned form by way of the fuel vapor filter.

The activated carbon in the fuel vapor filter may not be wetted with liquid hydrocarbons, such wetting would detrimentally affect the adsorptive properties of the activated carbon. For that reason it is known for collecting containers or beading-out containers to be disposed upstream of the fuel vapor filter in the venting lines. Any condensate which is produced as well as entrained liquid hydrocarbon particles are deposited out in the collecting container and added to the delivery volume of the fuel tank again in a suitable fashion.

Collecting containers of that kind are arranged in part outside the fuel tank and in part within it.

To avoid potential emission and leakage points, for example EP 1 196 303 proposes arranging such a collecting container within the fuel tank so that it is possible to dispense with the arrangement of lines which communicate the internal space of the fuel tank with the collecting container.

A further advantage of a collecting container which is disposed within the fuel tank is that it cannot tear away in the event of the motor vehicle crashing as the collecting container is arranged in a protected condition within the fuel tank.

It is readily understandable that the liquid fuel which occurs in the collecting container or beading-out container must be returned again to the delivery volume of the fuel tank. That can be easily effected for example by means of the force of gravity through a drain opening provided with a valve in the collecting container.

Depending on the respective pressure conditions in the fuel tank and depending on the respective position of installation of the collecting container, emptying thereof by virtue of the effect of the force of gravity is not always effectively possible.

Therefore EP 1 196 303 B1 proposes connecting the collecting container to the suction side of a suction jet pump present in the fuel tank. The suction jet pump can be operated for example by the return flow of fuel from the engine in operation of the motor vehicle. That effectively provides that the collecting container is sucked out.

Such an arrangement however suffers from the disadvantage that additional lines have to be placed within the fuel tank, which means that in particular the assembly complication and expenditure in completing the fuel tank becomes comparatively high.

SUMMARY

Therefore the object of the invention is to develop a fuel tank of the kind set forth in the opening part of this specification in such a way that effective emptying of the collecting container can be effected with means of the utmost simplicity.

That object is attained by the features of claim 1.

Advantageous configurations of the invention are set forth in the appendant claims.

The fuel tank according to the invention is distinguished in that disposed within the collecting container is a delivery pump for emptying it into the delivery volume of the fuel tank. In other words, the delivery pump for actively emptying the collecting container is completely integrated therein so that line connections for connecting same to a pump arranged outside it are unnecessary. That is advantageous in particular for the reason that mounting installation fitments in the fuel tank can generally only be effected through one or more inspection openings, the size of which is such that it is possible to pass thereinto with the hand, but it will be noted that in that case the assembly procedure has to be carried out without being able to view it. Accordingly that involves additional complication and expenditure for each line which is to be laid and clipped in the tank, the suction jet pump or the like. Finally it is necessary for such lines, as already indicated hereinbefore, to be fixed to the tank wall. In that respect the solution according to the invention represents a substantial simplification in terms of assembling the fuel tank.

It is particularly desirable if the delivery pump is driven by way of at least one fan wheel which is so arranged that it can be caused to rotate by the venting flow which is passed through the collecting container. In a particularly advantageous variant of the fuel tank according to the invention therefore the drive for the delivery pump is in the form of an axial turbine which utilises the venting volume flow during refuelling and in operation. In particular so-called 'on board fuel vapor recovery' systems which are wide-spread on the American market are suitable for that purpose. In that case the gas volume flow which is produced in the refuelling operation is passed for the major part by way of the fuel vapor filter, and the filling opening of the fuel tank is sealed off in relation to the refuelling gun during the refuelling procedure.

Desirably, the fan wheel is arranged with a pump impeller of the delivery pump on a common shaft.

The delivery pump can be for example in the form of a side passage pump. Side passage pumps have the advantage that they are of a particularly compact size and have few moving parts.

A variant of the fuel tank according to the invention provides that the fan wheel is arranged within a housing having an inner portion and an outer portion, that the inner portion forms a core tube portion which encloses the fan wheel and that the outer portion forms a casing tube portion which with the core tube portion forms a suction intake gap which narrows in the flow direction of the venting flow.

That arrangement provides that the venting flow which drives the fan wheel is accelerated within the housing or within the suction intake gap so that particularly effective utilisation of the kinetic energy of the gas flow is guaranteed.

Desirably the outer portion is in the form of a bowl which enlarges in the flow direction and whose bottom has the shaft of the fan wheel and the pump impeller respectively passing therethrough. The arrangement in that case is so selected that the gas inlet and the gas outlet from the housing are arranged on one side thereof.

The delivery pump can be connected for example with its pressure side to an outlet opening of the collecting container, which outlet opening communicates with the fuel tank. The outlet opening can be closed with a non-return valve.

In an alternative configuration of the fuel tank according to the invention the collecting housing comprises two chambers which communicate with each other by way of an overflow opening, wherein a first chamber is provided as a liquid collecting space and a second chamber is provided as a gas collecting space, the overflow opening is closable by a filling level-switched valve and the delivery pump is so connected that closure of the overflow opening causes a rise in pressure in the liquid collecting space so that emptying thereof occurs by way of an outlet opening into the delivery volume of the fuel tank. In this variant of the configuration of the collecting container the fuel in the liquid collecting space is not conveyed directly by way of the delivery pump, but rather the delivery pump serves only to increase the pressure and thus to provide for indirect emptying of the liquid collecting space when a certain level of liquid is attained therein.

In this embodiment of the invention the delivery pump can be connected at the suction side to the gas collecting space. The suction side of the pump can alternatively also be connected to the delivery volume of the fuel tank.

Desirably the delivery pump and the drive thereof are combined to form one unit.

BRIEF DESCRIPTION OF THE DRAWINGS

The invention is described hereinafter by means of an embodiment by way of example illustrated in the drawings in which:

FIG. 1 is a diagrammatic view of the fuel tank according to the invention,

FIG. 2 is a sectional view on an enlarged scale through the collecting container shown in FIG. 1 in accordance with a first embodiment of the invention, and FIG. 3 shows a view in section of an alternative configuration of the collecting container.

DETAILED DESCRIPTION

The fuel tank 1 shown in FIG. 1 includes in known manner a filler pipe 2 and means (not shown) for conveying and removing fuel for delivery thereof as well as means for introducing air into and venting the fuel tank 1 during refuelling and operation. In general the fuel tank 1 is for example in the form of a plastic tank which was produced in one piece by extrusion blow molding. It can be of a comparatively complicated, chamber-like structure involving various sub-volumes. The fuel tank 1 shown in FIG. 1 is illustrated in a greatly simplified form for the purposes of enhanced clarity.

For the purposes of venting the fuel tank in a refuelling operation or in operation, provided in the fuel tank are various ventilation points which can each be controlled with respective valves. From the valves venting lines 3 are taken by way of a collecting container 4 to a fuel vapor filter (activated carbon filter) (not shown).

For that purpose the collecting container 4 shown in the Figures is connected to an operational venting line identified by reference 3b and a refuelling venting line identified by reference 3a. Reference 5 denotes the pressure compensating line which is passed from the fuel tank 1 to an activated carbon filter. Also provided on the collecting container 4 is a drain opening 6 which is closed by a non-return valve 7.

The dimensional relationships of the lines 3, 5 shown in FIGS. 2 and 3 do not allow any conclusions at all to be drawn about their actual dimensioning in relation to each other. FIGS. 2 and 3 are also highly simplified diagrammatic views.

Reference is firstly made to FIG. 2 in which the collecting container 4 is shown in section on an enlarged scale. Arranged therein is a delivery pump 8 for emptying it, together with an associated drive 9. As will be further described hereinafter, the drive 9 is in the form of an axial turbine which is driven by way of the venting volume flow or by way of the carbon-enriched gas which is passed through the collecting container 4 in the venting operation.

The delivery pump 8 is in the form of a side passage pump which is known per se and whose pump impeller 10 is arranged on a common shaft 12 with a fan wheel 11 which belongs to the drive. The fan wheel 11 in turn is arranged in a two-part housing, wherein the housing includes an outer portion 14 and an inner portion 15. The outer portion 14 forms a casing tube and is of an approximately bowl-shaped configuration and enlarges conically at its side remote from the pump impeller 10. The shaft 12 passes through the bottom 16 of the outer portion 14 which forms the functional separation between the drive 9 and the pump. The tube-shaped inner portion 15 which encloses the fan wheel 11 is arranged within the outer portion 14 in such a way that a suction intake gap 17 which narrows conically in the flow direction is formed between the inner portion 15 and the outer portion 14.

Due to the reduction in cross-section of the suction intake gap 17 the gas flow experiences an acceleration effect. At the bottom 16 of the outer portion 14 the gas flow is finally deflected and passed axially through the inner portion 15 where it causes the fan wheel 11 to be driven. The fan wheel 11 in turn rotates the shaft 12 and therewith the pump impeller 10. The pump impeller 10, with the pump housing 18, forms a side passage 19 which in known manner is arranged to extend in a spiral configuration and connects an inlet opening 20 (suction side) and an outlet opening 21 (pressure side) of the delivery pump 8.

When refuelling the motor vehicle the gas volume flow which flows in through the refuelling venting line 3a drives the fan wheel 11 and therewith also the pump impeller 10. The liquid fuel 22 which is only illustrated by way of indication is sucked in through the inlet opening 20 and pumped through the outlet opening 21 against the non-return valve 7 into the delivery volume 23 of the fuel tank 1.

Reference is now made to the embodiment shown in FIG. 3 of the collecting container 4 which is subdivided by an intermediate wall 24 into two chambers, wherein a first chamber is in the form of a liquid collecting space 25 and a second chamber is in the form of a gas collecting space 26 or a gas inflow chamber.

In the embodiment illustrated in FIG. 3, identical components are denoted by the same references.

The unit consisting of the delivery pump 8 and the drive 9 passes through the intermediate wall 24 of the collecting container 4, with the outer portion 14 being sealed off with respect to the intermediate wall 24. Reference 27 denotes a suction intake snorkel which is connected to the inlet opening 20 of the delivery pump 8 and which also passes through the intermediate wall 24 and communicates with the gas collecting space 26. Also provided in the intermediate wall 24 is an overflow opening 28 by way of which the gas collecting space 26 and the liquid collecting space 25 communicate with each other as long as the level of the liquid fuel 22 in the liquid collecting space 25 does not exceed a certain height. The overflow opening 28 is closable by means of a float valve 29 when a given filling level is exceeded, in which case the valve body 30 is lifted by the fuel 22 and closes the overflow opening 28.

Particularly in a refuelling operation, the incoming gas volume flow which is passed by way of the pressure compensating line 5 to the activated carbon filter (not shown) drives the fan wheel 11 and therewith the pump impeller 10 of the delivery pump 8. The delivery pump 8 draws gas out of the gas collecting space 26 into the liquid collecting space 25 by way of the snorkel 27. As the gas collecting space 26 and the liquid collecting space 25 communicate with each other, the delivery pump 8 is operating virtually in a no-load mode. The condensed or beaded-out fuel 22 collects in the liquid collecting space 25 until the valve body 30 floats up and closes the overflow opening 28. That causes the delivery pump 8 to produce a pressure rise in the liquid collecting space 25, which causes emptying of the liquid collecting space 25 against the closing force of the non-return valve 7. The non-return valve 7 is in the form of a flutter valve with an elastomer disk as the closure body so that the closing force thereof is comparatively moderate.

LIST OF REFERENCES

1 fuel tank
2 filler pipe
3 venting lines
3*a* refuelling venting line
3*b* operational venting line
4 collecting container
5 pressure compensating line
6 drain opening
7 non-return valve
8 delivery pump
9 drive
10 pump impeller
11 fan wheel
12 shaft
13 housing
14 outer portion
15 inner portion
16 bottom of the outer portion
17 suction intake gap
18 pump housing
19 side passage
20 inlet opening
21 outlet opening
22 liquid fuel
23 delivery volume
24 intermediate wall
25 liquid collecting space
26 gas collecting space
27 snorkel
28 overflow opening
29 float valve
30 valve body

What is claimed is:

1. A fuel tank for a motor vehicle, comprising at least one venting device which is connected to a fuel vapor filter including vent lines connected to said venting device, and a fuel filler pipe for introduction of fuel to said tank, wherein the venting device includes at least one collecting container for receiving liquid fuel, characterized in that disposed within the collecting container is a delivery pump for emptying said collecting container of said liquid fuel into the delivery volume of the fuel tank, characterized in that the delivery pump is driven by way of at least one fan wheel which is so arranged that said at least one fan wheel can be caused to rotate by the venting flow of vapor which is passed through the collecting container to said filter, wherein upon introduction of liquid fuel in said fuel tank, said venting flow of vapor is formed in said fuel tank and directed into said vent lines and into said collecting container to rotate said fan wheel.

2. A fuel tank as set forth in claim 1 characterized in that the fan wheel is arranged with a pump impeller of the delivery pump on a common shaft.

3. A fuel tank as set forth in claim 1 characterized in that the delivery pump is in the form of a side passage pump.

4. A fuel tank as set forth in claim 1 characterized in that the delivery pump is connected with its pressure side to an outlet opening of the collecting container, which outlet opening communicates with the fuel tank.

5. A fuel tank as set forth in claim 1 characterized in that the delivery pump and a drive thereof are combined to form one unit.

\* \* \* \* \*